(12) United States Patent
Luecke et al.

(10) Patent No.: US 7,708,441 B2
(45) Date of Patent: May 4, 2010

(54) MOVING LIGHT SPOTS IN ILLUMINATION FIBERS

(75) Inventors: Bernd Luecke, Regensberg (DE); Martin Weigert, Etterzhausen (DE); Thomas Lichtenegger, Alteglofsheim (DE)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 1 day.

(21) Appl. No.: 12/021,385

(22) Filed: Jan. 29, 2008

(65) Prior Publication Data

US 2009/0190370 A1 Jul. 30, 2009

(51) Int. Cl.
*G05D 25/00* (2006.01)
(52) U.S. Cl. .................. 362/552; 362/554; 362/555
(58) Field of Classification Search .............. 362/26, 362/27, 551, 552, 554, 555, 556, 559, 560, 362/581, 582, 583, 295, 394
See application file for complete search history.

(56) References Cited

U.S. PATENT DOCUMENTS

| | | | |
|---|---|---|---|
| 4,786,127 A * | 11/1988 | Molnar | ................. 362/551 |
| 4,975,809 A | 12/1990 | Ku | |
| 5,345,531 A | 9/1994 | Keplinger et al. | |
| 5,400,225 A * | 3/1995 | Currie | ................. 362/554 |
| 5,508,892 A * | 4/1996 | Laczynski et al. | ........... 362/583 |
| 6,307,504 B1 | 10/2001 | Sheynblat | |
| 6,526,200 B1 * | 2/2003 | Davie | ................. 362/559 |
| 6,830,366 B2 * | 12/2004 | Irie | ................. 362/552 |
| 2004/0151430 A1 | 8/2004 | Neuberger | |

FOREIGN PATENT DOCUMENTS

| | | |
|---|---|---|
| AT | 369571 | 1/1983 |
| DE | 19615516 | 10/1997 |
| WO | WO 2007030891 A1 * | 3/2007 |

* cited by examiner

Primary Examiner—Y My Quach Lee (57) ABSTRACT

An electronic display includes a light source system and a light guide system, where the light guide system emits light features laterally, i.e., from the side, at selected positions along its length. The light source system includes one or more electronically controllable light sources and further includes optical switches or other arrangements for coupling the light sources to the optical fibers or other light guides of the light guide system. The light source system can sequentially or progressively increase the selected longitudinal position at which the light feature is emitted, resulting in the appearance of movement of the light feature along the length of the light guide system.

4 Claims, 7 Drawing Sheets

MOVING LIGHT SPOTS IN ILLUMINATION FIBERS

BACKGROUND

Displays of spots of light appearing to move along a straight or curved line are used for ornamental, signaling and similar purposes. A display of this type can comprise a linear array of light sources, such as lamps or light-emitting diodes (LEDs). By successively illuminating light sources along the array, a spot of light can be made to appear as though it is moving. Large displays of this type, such as those used in outdoor signage, can comprise arrays of incandescent lamps. Smaller displays of this type, comprising linear arrays of LEDs, have been used as indicators in electronic instruments and meters. Linear arrays of LEDs have also been used for ornamental and signaling purposes in electronic devices such as cellular telephones.

Figure 1:
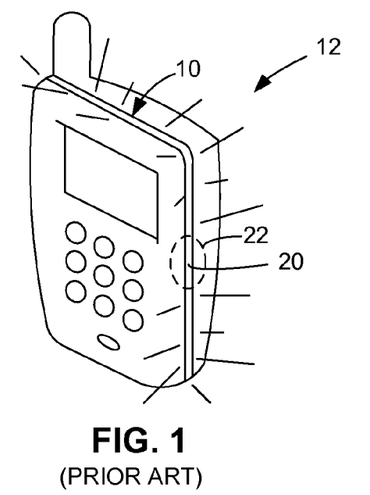
FIG. 1 is a perspective view of a cellular telephone having a conventional moving-light display.
Figure 2A:
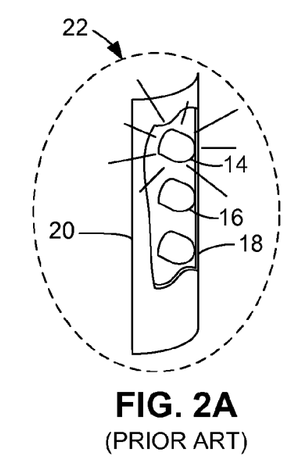
FIG. 2A is a perspective of an enlarged portion of FIG. 1A, showing the display at a first moment in time.
Figure 2B:
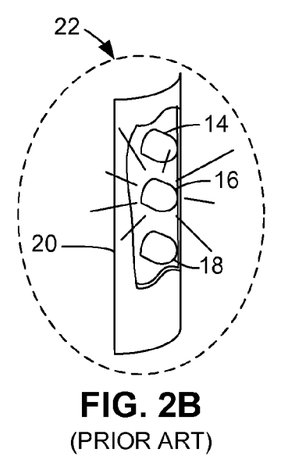
FIG. 2B is a perspective of an enlarged portion of FIG. 1A, showing the display at a second moment in time.
Figure 2C:
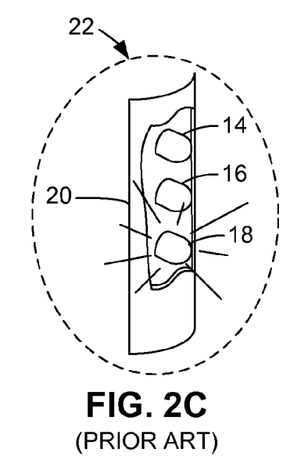
FIG. 2C is a perspective of an enlarged portion of FIG. 1A, showing the display at a third moment in time.

For example, as illustrated in FIGS. 1 and 2A-C, a moving-light display 10 disposed around the periphery of the housing of a cellular telephone 12 can comprise an array of LEDs 14, 16, 18, etc. (with others not shown for purposes of clarity). The LEDs 14, 16, 18, etc., can be covered by a translucent sheath 20 (shown partially cut away in enlarged area 22 in FIGS. 2A-C to expose LEDs 14-18 for explanatory purposes). To provide a moving-light effect, LED 14 can be momentarily turned on, i.e., illuminated, while LEDs 16 and 18 are turned off, as shown in FIG. 2A; then, LED 16 can be momentarily turned on while LEDs 14 and 18 are turned off, as shown in FIG. 2B; and then LED 18 can be momentarily turned on while LEDs 14 and 16 are turned off, as shown in FIG. 2C. Such a sequence of LED illumination provides a visual effect resembling a moving spot of light that follows the path of display 10 around the periphery of the telephone housing. Effects other than a moving spot of light can be produced by flashing the various LEDs in other patterns, such as alternately turning on the even LEDs and odd LEDs. Different display effects can be used to signal different events. For example, display 10 can provide the above-described moving-light effect to notify the user of an incoming call, and provide a flashing but fixed pattern to notify the user of a missed call or incoming text message. The display can flash in synchronism with a ringtone.

It would be desirable to provide a moving-light display that is more economical, less complex, and more readily scalable than prior displays of this type.

SUMMARY

In exemplary embodiments of the invention, an electronic display comprises a light source system and an elongated light guide system, where the elongated light guide system emits light features laterally, i.e., from the side, at selected positions along its length. The light source system includes one or more electronically controllable light sources and suitable means for optically coupling them to the fibers or other light guides of the light guide system.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

In one exemplary embodiment, described below in further detail with respect to the drawing figures, the elongated light guide system comprises at least one fiber or other elongated light guide, and the light source system comprises at least a pair of light sources (e.g., LEDs), where the light sources are coupled to opposing ends of a fiber. Accordingly, each light source illuminates a section of the fiber nearest it, with the two sections meeting at a transition zone. The light sources can be of the same color or, alternatively, of different colors. The light guide system emits a light feature at the transition zone. The light feature can be any visually discernible difference in intensity, color or other characteristic between the two sections. By controlling the intensity or other characteristic of the light emitted by one light source with respect to the other light source, the position of the transition zone (and thus of the emitted light feature) along the length of the light guide can be adjusted. Progressively increasing the longitudinal position of the transition zone along the length of the light guide causes the light feature to appear to move.

In other exemplary embodiments, described below in further detail with respect to the drawing figures, the light guide system comprises a plurality of fibers and one or more light sources, where the light source system comprises at least one light source (e.g., light-emitting diode (LED), laser diode, etc.) and a means for selectably coupling the light source to a fiber. Each fiber has an outcoupling zone disposed at a different position along the length of the light guide system (e.g., a staggered arrangement). An outcoupling zone can comprise any suitable grating, groove, roughened surface, or other feature or structure formed in or disposed on a fiber that causes light to escape the fiber from the side, i.e., laterally, in a localized area. By selecting a fiber to illuminate that has its outcoupling zone at a selected position, the position of the emitted light feature along the length of the light guide system can be adjusted. Progressively selecting fibers having outcoupling zones at increasing longitudinal positions causes the light feature to appear to move.

The light source system can be controlled in any suitable manner, such as by providing a plurality of light sources, each coupled to one of the fibers or, alternatively, by providing a single light source and a suitable optical switch that can couple the light source to a selected fiber. The switch can comprise, for example, an electromechanically movable mirror, electromechanically moveable aperture plate, an electro-optically controllable light-transmission (e.g., liquid crystal) matrix, or other suitable device.

Electronic displays in accordance with embodiments of the invention can be used in any suitable manner, such as for ornamental or signaling purposes. As used in this patent specification ("herein"), terms such as "line," "linear," "length," "longitudinal," etc., are not intended to limit the arrangement of the light guide system to a straight line but rather are intended to encompass within their scope of meaning any suitable straight or curved line or other arrangement. Thus, for example, a light guide system can be disposed on or in objects in a manner that follows their shapes, outlines or contours.

Figure 3:
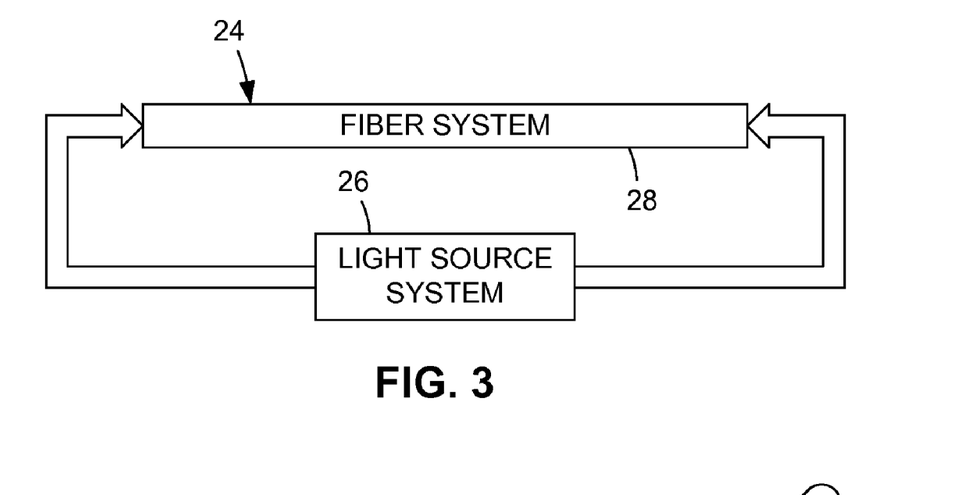
FIG. 3 is a block diagram of a moving-light display in accordance with exemplary embodiments of the present invention.

As illustrated in FIG. 3, a light guide system 24 is optically coupled to a light source system 26. In the illustrated embodiment, light guide system 24 is an elongated structure comprising a bundle of one or more substantially parallel optical fibers, and can be mounted on or in any suitable structure. For example, light guide system 24 can be used in place of and for the same purposes as the conventional moving-light display 10 described above with regard to FIG. 1. Light guide system 24 can be of any suitable length and be arranged in any suitable shape or pattern, i.e., it can follow any straight or curving path or line along which an optical fiber can be disposed. Light guide system 24 can include a suitable translucent sheath or cover 28 over or surrounding the one or more fibers. Although light source system 26 is shown in FIG. 3 as introducing light into both ends of light guide system 24, in some embodiments of the invention, as described in further detail below, light source system 26 introduces light into only one end of light guide system 24. Light source system 26 includes suitable electronics and opto-electronics (not separately shown) for producing visible light and introducing it into light guide system 24 in the manner described below.

Figure 4:
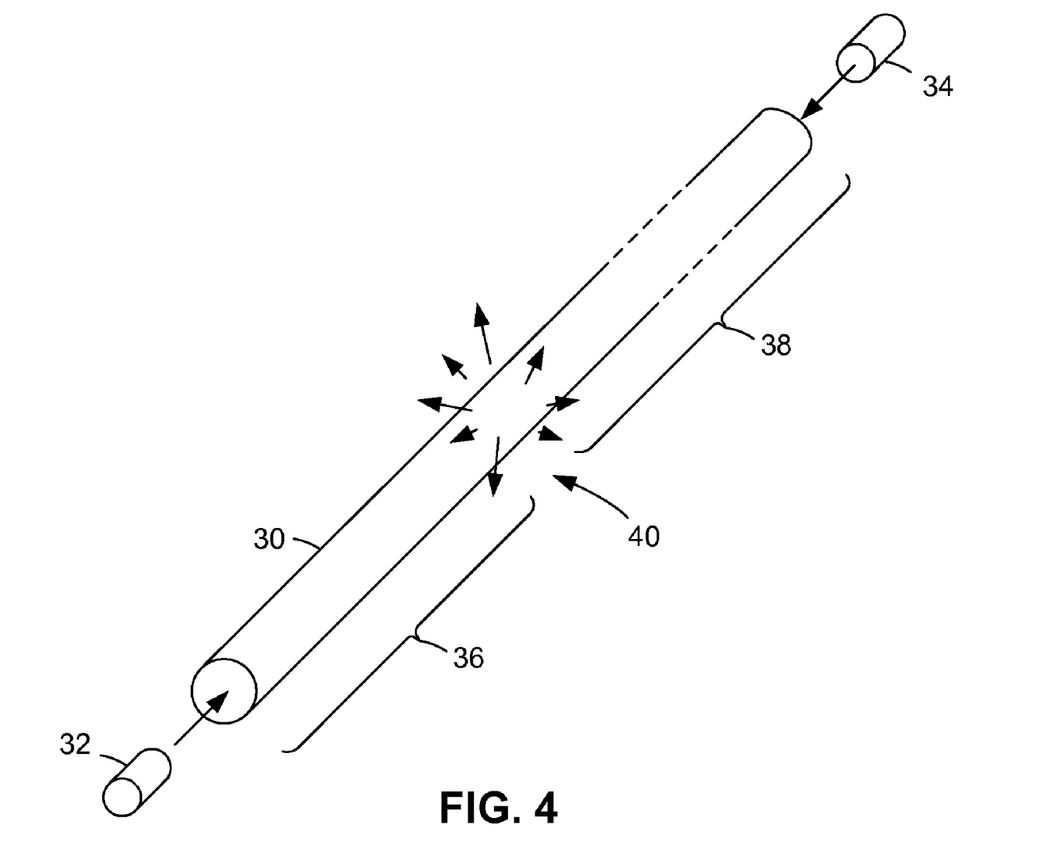
FIG. 4 is a diagrammatic perspective view of a moving-light electronic display in accordance with a first exemplary embodiment of the invention.

In the embodiment illustrated in FIG. 4, light guide system 24 (FIG. 3) comprises at least one fiber 30, and light source system 26 (FIG. 3) comprises first and second light sources 32 and 34. Light sources 32 and 34 can be LEDs, lasers, or any other suitable device or system that generates visible light. In some embodiments of the invention, light sources 32 and 34 can be of different colors. For example, light source 32 can emit red light, and light source 34 can emit green light.

Light source 32 is optically aligned with or otherwise optically coupled to a first end of fiber 30 so that, when the light source system electronics apply a current to light source 32, the light it emits is introduced into that end of fiber 30.

Likewise, light source 34 is optically aligned with or otherwise optically coupled to a second end of fiber 30 so that, when the light source system electronics apply a current to light source 34, the light it emits is introduced into that end of fiber 30. Although not shown for purposes of clarity, other optical elements, such as lenses, can also be included. In addition, although similarly not shown for purposes of clarity, mechanical and electrical elements, such as modules, couplings, supports, fibers, wires, etc., for interconnecting the other elements, can similarly be included, as will be well understood by persons of ordinary skill in the art to which the invention relates.

Light emitted by light source 32 illuminates a first section 36 of fiber 30, and light emitted by light source 34 illuminates a second section 38 of fiber 30. The relative lengths of sections 36 and 38 with respect to each other are dependent upon the relative amplitudes, wavelengths or other characteristics of the emitted light. In an embodiment in which light sources 32 and 34 are identical, the relative lengths of sections 36 and 38 are dependent upon the relative currents (i.e., their ratio) that the light source system supplies to light sources 32 and 34.

A light feature, represented in FIG. 4 by arrows directed away from fiber 30, is emitted at the transition zone 40 where sections 36 and 38 meet. In embodiments in which the light with which sections 36 and 38 are illuminated are of the same color, the light feature is visually perceptible from the side of fiber 30 (i.e., laterally) as a spot having greater intensity, i.e., brighter, than the light that is perceptibly emitted laterally from sections 36 and 38. More generally, the light feature can comprise any visually perceptible difference between the light emitted laterally at transition zone 40 and the light emitted laterally at sections 36 and 38. For example, in embodiments in which sections 36 and 38 are illuminated with different colors, the light feature comprises a transition between the two colors.

A feature of the invention is a method by which the spot or other light feature can be made to appear to move along the length of the light guide system. The longitudinal position of transition zone 40 is defined by the relative lengths of sections 36 and 38, which in turn are responsive to the relative currents that the light source system supplies light sources 32 and 34. Therefore, by causing the light source system to sequentially or progressively change the ratio of these currents at a rate slow enough to produce a visually perceptible effect, the feature can be made to appear to move along the length of the light guide system.

Figure 5:
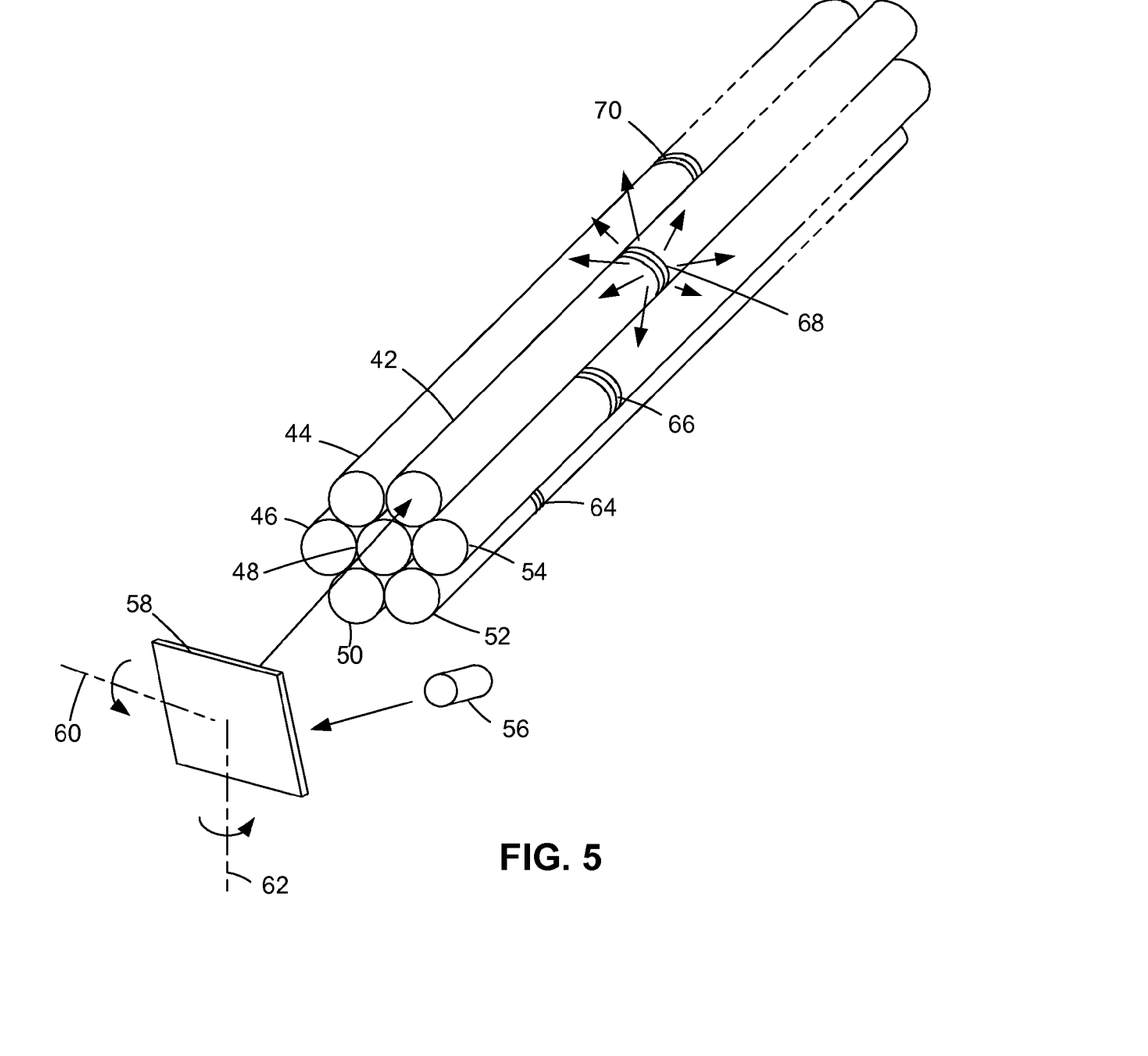
FIG. 5 is a diagrammatic perspective view of a moving-light electronic display in accordance with a second exemplary embodiment of the invention.

In a second embodiment, illustrated in FIG. 5, light guide system 24 (FIG. 3) comprises any suitable number of fibers 42, 44, 46, 48, 50, 52, 54, etc., and light source system 26 (FIG. 3) comprises at least one light source 56 and an optical switch such as an electromechanically movable micro-mirror 58. Although not shown for purposes of clarity, micro-mirror 58 includes a suitable electronically controllable mechanism that can swivel the mirrored surface about two mutually perpendicular axes (i.e., two degrees of freedom) 60 and 62, to reflectively redirect light received from light source 56 into the end of any selected one of fibers 42, 44, 46, 48, 50, 52, 54, etc. As such a micro-mirror 58 is well within the understanding of persons skilled in the art to which the invention relates, it is not described in further detail herein. As in the embodiment described above, light source 56 can be an LED, laser, or any other suitable device or system that generates visible light. As similarly described above, other optical, electrical, and mechanical elements can be included but are not shown for purposes of clarity.

Although in the illustrated embodiment of the invention the elongated light guide system comprises a bundle of one or more optical fibers that serve as optical light guides, the term "light guide" is intended to include within its scope of meaning any other suitable element that conducts or guides light, such as a molded plastic structure. It should also be noted that the term "fibers" as used herein includes within its scope of meaning not only individual fibers that have been bundled together as in the illustrated embodiments but also any suitable fiber structure having more than one core or otherwise capable of carrying more than one light beam.

Each of fibers 42, 44, 46, 48, 50, 52, 54, etc., has an associated outcoupling zone 64, 66, 68, 70, etc. (others of which may not be visible in the perspective view of FIG. 8). Each of outcoupling zones 64, 66, 68, 70, etc., can comprise any suitable structure or feature disposed on or formed in the corresponding fiber that can laterally emit a light feature of the type described above. Examples include gratings, grooves, rough surface finishes, scattering centers, and sharp bends. Accordingly, when the light source system activates light source 56 and positions micro-mirror 58 to redirect the emitted light into an end of a selected one of fibers 42, 44, 46, 48, 50, 52, 54, etc., a light feature is laterally emitted from the associated one of outcoupling zones 64, 66, 68, 70, etc. The light feature, represented in FIG. 5 by arrows directed away from outcoupling zone 68 as an example, is visually perceptible from the side of the light guide system (i.e., laterally) as a spot having greater intensity, i.e., brighter, than the light that is perceptibly emitted laterally from other portions of the light guide system (e.g., than the light that escapes laterally from fiber 42 in the example shown in FIG. 5).

The light feature can be made to appear to move along the length of the elongated light guide system by causing the light source system to sequentially redirect the light emitted by light source 56 into selected fibers having outcoupling zones at positions progressing along the length of the light guide system, i.e., at progressively increasing distances from a reference or starting point. The light feature is accordingly emitted from successive outcoupling zones, i.e., at progressively increasing distances from its starting point. (Note that the term "increasing" is used herein in the sense of monotonic, as the light feature can be made to appear to move in either direction. Indeed, various visual effects can be generated by causing various combinations of fibers to emit light features in various combinations with each other, moving in different directions from each other, flashing or blinking in fixed positions, etc.)

Figure 6:
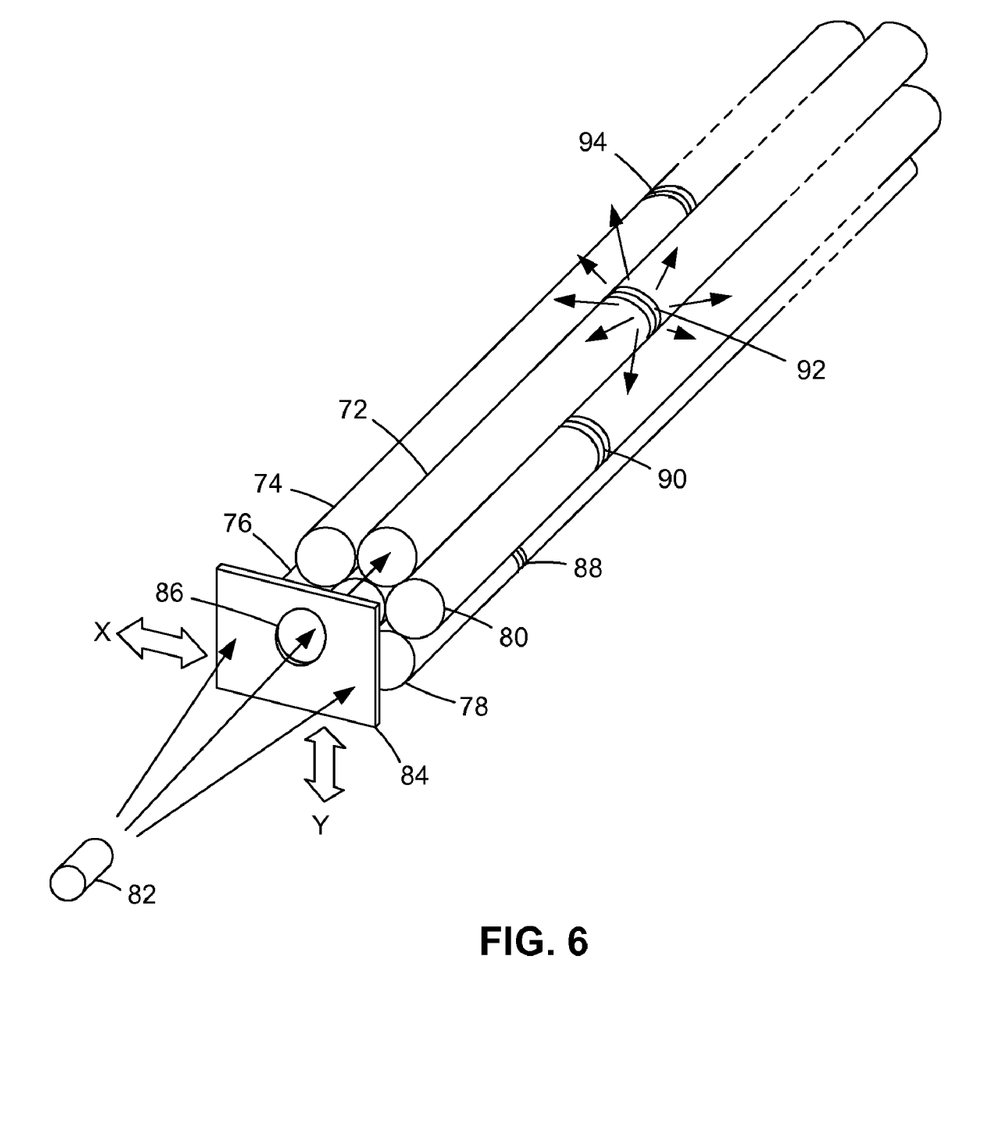
FIG. 6 is a diagrammatic perspective view of a moving-light electronic display in accordance with a third exemplary embodiment of the invention.

In a third embodiment, illustrated in FIG. 6, light guide system 24 (FIG. 3) comprises any suitable number of fibers 72, 74, 76, 78, 80, etc., and light source system 26 (FIG. 3) comprises at least one light source 82 and an optical switch such as an electromechanically movable aperture plate 84. Aperture plate 84 is opaque but for a hole or aperture 86. Although not shown for purposes of clarity, aperture plate 84 includes a suitable electronically controllable mechanism that can move the plate (and thus aperture 86) in a plane in X and Y directions, to mask light emitted by light source 82 through aperture 86 into the end of any selected one of fibers 72, 74, 76, 78, 80, etc. As such a movable aperture plate 84 is well within the understanding of persons skilled in the art to which the invention relates, it is not described in further detail herein. As in the embodiment described above, light source 82 can be an LED, laser, or any other suitable device or system that generates visible light. As similarly described above, other optical, electrical, and mechanical elements can be included but are not shown for purposes of clarity.

Each of fibers 72, 74, 76, 78, 80, etc., has an associated outcoupling zone 88, 90, 92, 94, etc. (others of which may not be visible in the perspective view of FIG. 8), of the type described above. When the light source system activates light source 82 and positions aperture plate 84 to mask the emitted light through aperture 86 into an end of a selected one of fibers 72, 74, 76, 80, etc., a light feature is laterally emitted from the associated one of outcoupling zones 88, 90, 92, 94, etc. Similarly to other embodiments, the light feature can be made to appear to move along the length of the light guide system by causing the light source system to sequentially mask the light emitted by light source 82 into selected fibers having outcoupling zones at positions progressing along the length of the light guide system.

Figure 7:
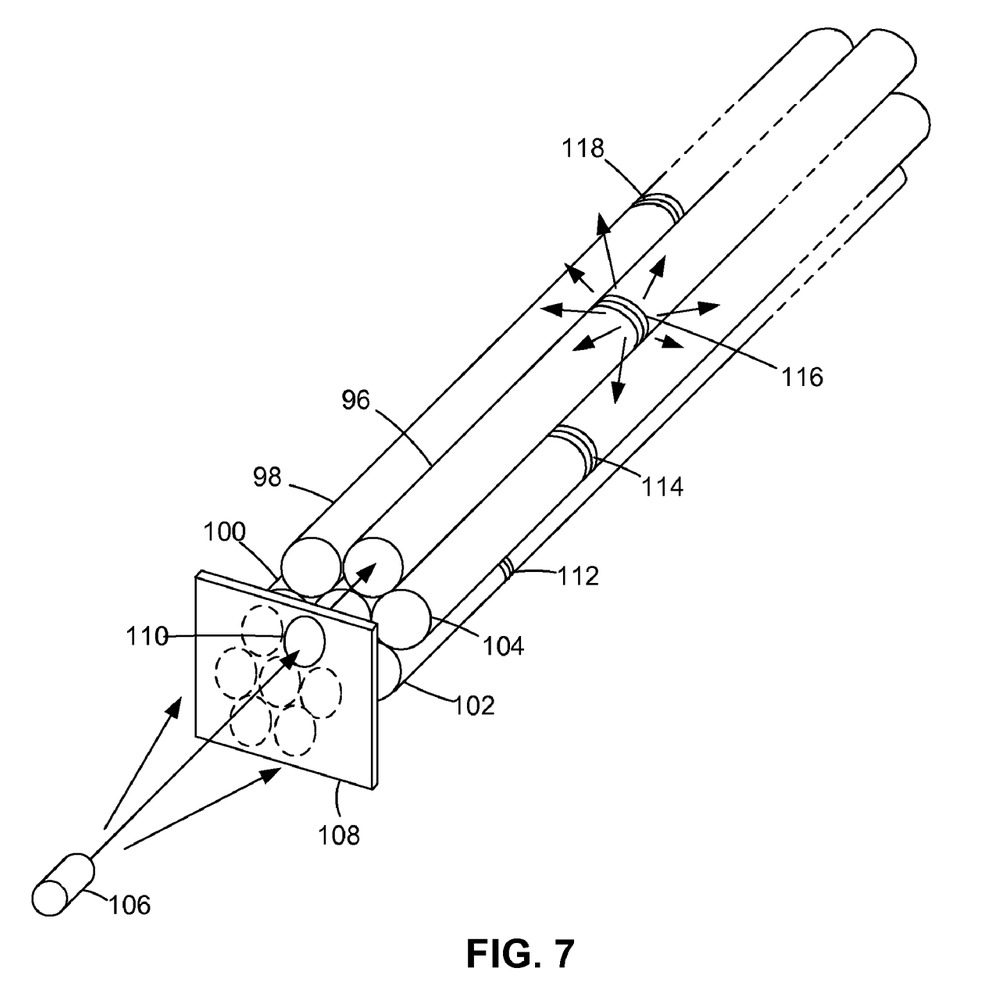
FIG. 7 is a diagrammatic perspective view of a moving-light electronic display in accordance with a fourth exemplary embodiment of the invention.

In a fourth embodiment, illustrated in FIG. 7, light guide system 24 (FIG. 3) comprises any suitable number of fibers 96, 98, 100, 102, 104, etc., and light source system 26 (FIG. 3) comprises at least one light source 106 and an optical switch such as an electro-optically controllable light-transmission (e.g., liquid crystal) matrix 108. Light-transmission matrix 108 has electro-optically transmissive regions 110 that can be changed from an opaque state to a light-transmissive state in response to electronic control signals. Each of regions 110 is individually controllable, i.e., selectably activatable, to allow light emitted by light source 106 to be transmitted through a selected, activated one of regions 110 and blocked by regions 110 that are not activated. Each of regions 100 is optically aligned with or otherwise optically coupled to the end of a corresponding one of fibers 96, 98, 100, 102, 104, etc. The light that is transmitted through the activated region 110 impinges upon the end of the (thus correspondingly selected) one of fibers 96, 98, 100, 102, 104, etc. As such an electro-optically controllable light-transmission matrix 108 is well within the understanding of persons skilled in the art to which the invention relates, it is not described in further detail herein. As in the embodiments described above, light source 106 can be an LED, laser, or any other suitable device or system that generates visible light. As similarly described above, other optical, electrical, and mechanical elements can be included but are not shown for purposes of clarity.

Each of fibers 96, 98, 100, 102, 104, etc., has an associated outcoupling zone 112, 114, 116, 118, etc. (others of which may not be visible in the perspective view of FIG. 7), of the type described above. When the light source system activates light source 106 and causes matrix 108 to transmit light through the activated region 110 into an end of the correspondingly selected one of fibers 96, 98, 100, 102, 104, etc., a light feature is laterally emitted from the associated one of outcoupling zones 112, 114, 116, 118, etc. Similarly to other embodiments, the light feature can be made to appear to move along the length of the light guide system by causing the light source system to sequentially activate regions 110 to transmit light emitted by light source 106 into fibers having outcoupling zones at positions progressing along the length of the light guide system.

Figure 8:
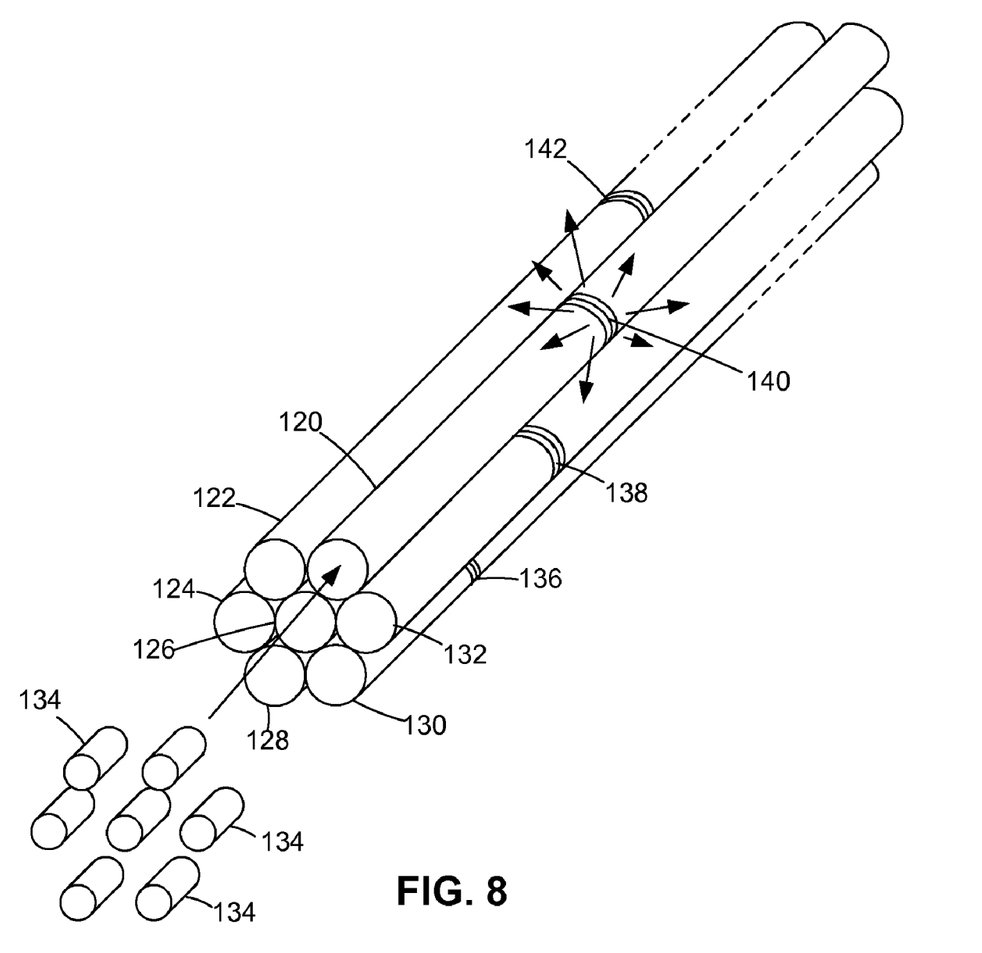
FIG. 8 is a diagrammatic perspective view of a moving-light electronic display in accordance with a fifth exemplary embodiment of the invention.

In a fifth embodiment, illustrated in FIG. 8, light guide system 24 (FIG. 3) comprises any suitable number of fibers 120, 122, 124, 126, 128, 130, 132, etc., and light source system 26 (FIG. 3) comprises a corresponding number of light sources 134, with each light source optically coupled to an end of a corresponding fiber. Each light source 134 can be individually controlled, i.e., selectably activated. The light that is transmitted through an activated one of light sources 134 impinges upon the end of the (thus correspondingly selected) one of fibers 120, 122, 124, 126, 128, 130, 132, etc. As in the embodiments described above, light sources 134 can be LEDs, lasers, or any other suitable devices or systems that generate visible light. As similarly described above, other optical, electrical, and mechanical elements can be included but are not shown for purposes of clarity.

Each of fibers 120, 122, 124, 126, 128, 130, 132, etc., has an associated outcoupling zone 136, 138, 140, 142, etc. (others of which may not be visible in the perspective view of FIG. 8), of the type described above. When the light source system activates a selected one of light sources 134 it emits light into an end of the correspondingly selected one of fibers 96, 98, 100, 102, 104, etc., a light feature is laterally emitted from the associated one of outcoupling zones 136, 138, 140, 142, etc. Similarly to other embodiments, the light feature can be made to appear to move along the length of the light guide system by causing the light source system to sequentially activate light sources 134 to transmit light into fibers having outcoupling zones at positions progressing along the length of the light guide system.

A method for generating a light display using an electronic display apparatus such as those described above is illustrated in FIG. 9. At step 144, the light source system generates control signals. The control signals include information defining a selected longitudinal position along light guide system at which a light feature is to be emitted. At step 146, the light source system controls introduction of light into the light guide system in response to the control signals.

In embodiments in which an apparatus along the lines of that illustrated in FIG. 4 is used, where the longitudinal position can be defined by the transition zone at which beams emitted by opposing light sources meet, the currents of control signals supplied to the light sources can have a ratio related to the selected longitudinal position, as described above with regard to FIG. 4. In embodiments in which an apparatus along the lines of those illustrated in FIGS. 5-8 is used, where the longitudinal position can be defined by a corresponding fiber that is selected based upon the longitudinal position of its outcoupling zone, the control signals are applied to a suitable optical switch that optically couples a light source to the selected fiber or to a light source fixedly coupled to the selected fiber.

Figure 9:
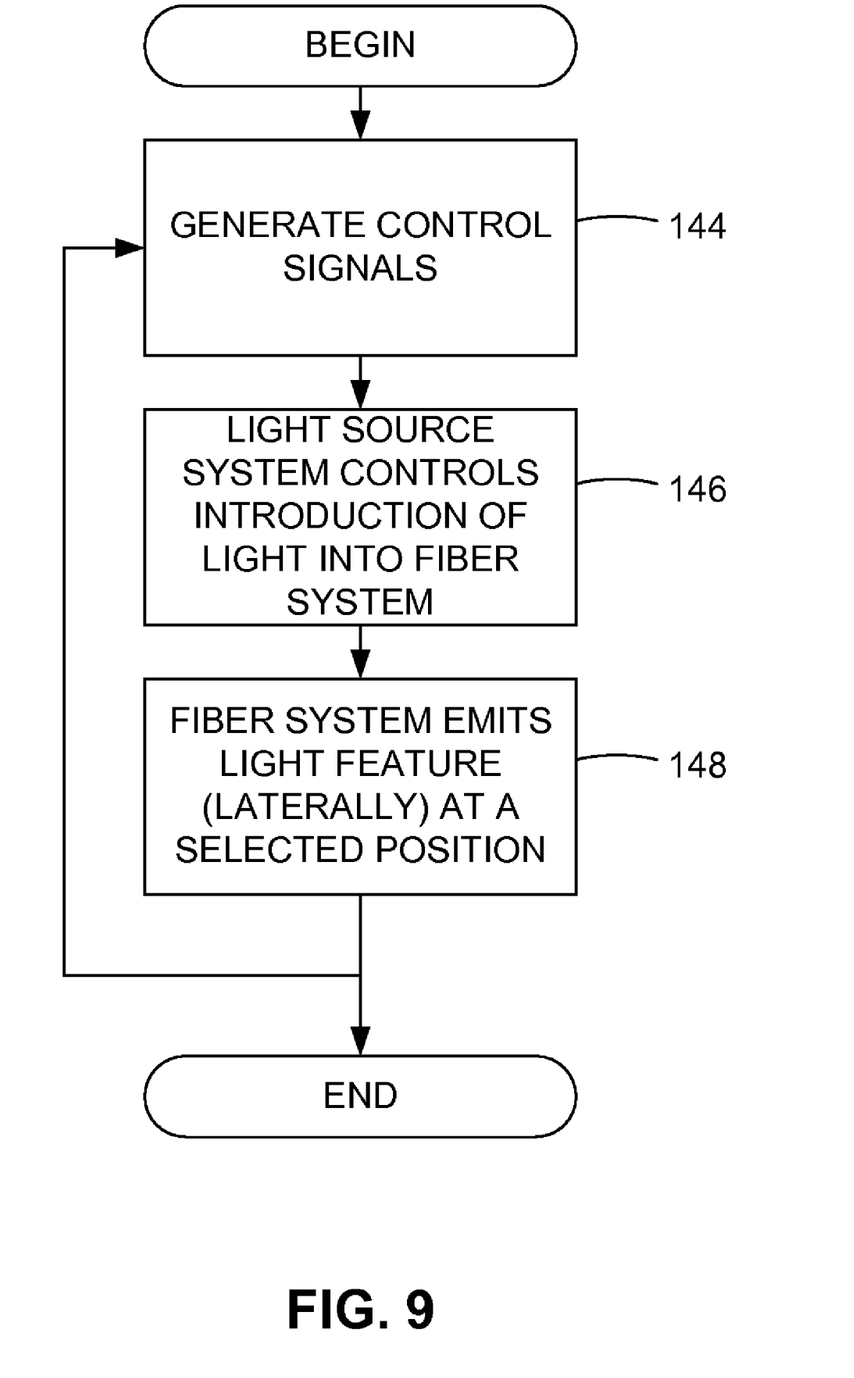
FIG. 9 is a flow diagram illustrating a method for generating a light display in accordance with an exemplary embodiment of the invention.

As indicated by step 148, the result of steps 144 and 146 is that a light feature, such as a spot of light, is emitted at the selected longitudinal position along the light guide system. Returning from step 148 to step 144 indicates that, during a time interval or functional state (the control of which is not shown for purposes of clarity) in which the light display is to be generated, the steps of generating control signals and controlling the introduction of light into the light guide system can be performed repeatedly, in accordance with a sequence or program representing the lighting effect to be produced. For example, each time step 144 is performed, the longitudinal position can be incremented, resulting in emission of the light feature at increasing longitudinal positions, thereby providing the appearance of movement of the light feature along the light guide system.

One or more illustrative embodiments of the invention have been described above. However, it is to be understood that the invention is defined by the appended claims and is not limited to the precise embodiments described.

What is claimed is:

1. An electronic display apparatus, comprising:
   an elongated light guide system extending longitudinally to define an elongated display, the light guide system comprising one or more substantially parallel light guides, the light guide system laterally emitting a light feature from a light guide at a longitudinal position along the elongated display, each of the light guides comprising at least one optical fiber having a first end and a second end;
   a first light source optically coupled to the first end of the optical fiber;
   a second light source optically coupled to the second end of the optical fiber; and
   a controller, the controller providing a first input signal to the first light source and a second input signal to the second light source, the controller adjusting at least one of the first and second input signals relative to the other to sequentially select increasing longitudinal positions along the elongated display and cause the first light source to illuminate a first section of the optical fiber and the second light source to simultaneously illuminate a second section of the optical fiber, whereby the light feature is laterally emitted at a transition zone between the first and second sections, the transition zone moving among the longitudinal positions.

2. The electronic display apparatus claimed in claim 1, wherein the first light source and second light source emit different colors from one another, and the light feature comprises a transition between the different colors.

3. A method for generating a light display in an elongated light guide system comprising one or more substantially parallel optical light guides, a first light source and a second light source, each of the light guides comprising at least one optical fiber having a first end and a second end, the method comprising:
   generating control signals including information defining a selected longitudinal position along the light guide system, the control signals including a first input signal provided to the first light source and a second input signal provided to the second light source, wherein generating control signals comprises adjusting at least one of the first and second input signals relative to the other to sequentially select increasing longitudinal positions;
   controlling a light source system in response to the control signals including causing the first light source to introduce light into the first end of the optical fiber to illuminate a first section of the optical fiber and the second light source to simultaneously introduce light into the second end of the optical fiber to illuminate a second section of the optical fiber, the light source system adjusting one or more of the first input signal and the second input signal to define the selected longitudinal position; and
   laterally emitting a light feature from the light guide system at the selected increasing longitudinal positions along the light guide system, wherein a transition zone between the first section of the optical fiber and the second section of the optical fiber moves among the selected longitudinal positions.

4. The method claimed in claim 3, wherein the first light source and second light source are of different colors.

* * * * *